(12) United States Patent
Lin

(10) Patent No.: US 12,498,719 B2
(45) Date of Patent: Dec. 16, 2025

(54) ON-BOARD REDUNDANT CONTROLLER AND STANDBY AVIATION SENSORS IN-FLIGHT RECONFIGURABLE AUTONOMOUS FLIGHT SYSTEM

(71) Applicant: Huan-Jung Lin, Yun-Lin Hsien (TW)

(72) Inventor: Huan-Jung Lin, Yun-Lin Hsien (TW)

(73) Assignee: National Formosa University, Yun-Lin Hsien (TW)

( * ) Notice: Subject to any disclaimer, the term of this patent is extended or adjusted under 35 U.S.C. 154(b) by 272 days.

(21) Appl. No.: 18/385,422

(22) Filed: Oct. 31, 2023

(65) Prior Publication Data

US 2025/0138529 A1    May 1, 2025

(51) Int. Cl.
| | | |
|---|---|---|
| *G05D 1/87* | (2024.01) | |
| *G05D 1/00* | (2006.01) | |
| *G05D 109/20* | (2024.01) | |

(52) U.S. Cl.
CPC ........... *G05D 1/0077* (2013.01); *G05D 1/101* (2013.01); *B64U 2201/00* (2023.01); *B64U 2201/10* (2023.01); *G05D 2109/20* (2024.01)

(58) Field of Classification Search
CPC ............ B64U 2201/00; B64U 2201/10; G05D 2109/20; G05D 2109/22; G05D 1/87; B64C 19/00
See application file for complete search history.

(56) References Cited

U.S. PATENT DOCUMENTS

| | | | | |
|---|---|---|---|---|
| 9,250,630 | B2* | 2/2016 | Downey | G06F 21/44 |
| 11,257,383 | B2* | 2/2022 | Gansmandel | G08G 5/59 |
| 11,323,214 | B2* | 5/2022 | MacAfee | H04L 1/08 |
| 11,939,041 | B2* | 3/2024 | Zwiener | G05D 1/46 |
| 12,330,772 | B1* | 6/2025 | Furman | B64C 19/00 |
| 2024/0310850 | A1* | 9/2024 | Stephan | G05D 1/86 |

FOREIGN PATENT DOCUMENTS

| | | | | | |
|---|---|---|---|---|---|
| KR | 20250077208 | A | * | 5/2025 | ........... B64C 39/024 |

* cited by examiner

*Primary Examiner* — Brian M O'Hara

(57) ABSTRACT

The present invention relates to an on-board redundant controller and standby aviation sensors in-flight reconfigurable autonomous flight system, which includes UAV, primary autopilot module, secondary autopilot module and switching module. The primary autopilot module and secondary autopilot module are equipped with first aviation sensing module and second aviation sensing module. The primary autopilot module produces response signal according to the request signal produced by the secondary autopilot module. When the first response signal is no longer produced by the primary autopilot module for a preset time, the first switching module switches controls of the flight control module from the primary autopilot module to the secondary autopilot module, and the secondary autopilot module uses the aviation data of the second aviation sensing module to provide flight control signals to the flight control module.

12 Claims, 8 Drawing Sheets

ON-BOARD REDUNDANT CONTROLLER AND STANDBY AVIATION SENSORS IN-FLIGHT RECONFIGURABLE AUTONOMOUS FLIGHT SYSTEM

FIELD OF THE INVENTION

The present invention relates to an on-board redundant controller and standby aviation sensors in-flight reconfigurable autonomous flight system, especially to a reconfigurable autonomous flight system for high-altitude long-endurance (HALE) solar-powered unmanned aircraft with dual aviation sensing modules.

BACKGROUND OF THE INVENTION

As we known, once the HALE solar-powered unmanned aircraft takes off and flies, it can rely on the power supply of solar cells and the energy storage cycle of batteries to fly for several days in a short time or several months in a long time. Through the HALE solar-powered unmanned aircraft, the user can observe the ground in the air for a long time. It can be seen that the biggest advantage of HALE solar-powered unmanned aircraft is that it can replace satellites to perform tasks. Satellite technology has the needs of national defense and people's livelihood applications, and the HALE solar-powered UAV is a combination of satellite and unmanned aerial vehicle, and endows unmanned aerial vehicles with new applications and challenges. HALE solar-powered UAVs are recognized by the international aerospace community as satellites in the atmosphere. They can fly in the stratosphere at an altitude of 20 kilometers, provide satellite-like services, and have low manufacturing costs, better camera resolution and communication quality than satellites, and are recyclable and repairable. At present, Airbus's Zephyr, BAE Systems' PHASA, and Boeing's Odysseus are the most fruitful. South Korea's EAV1~3 is tested almost every year. Switzerland's AtlantikSolar has a wingspan of 6 meters, and in July 2015 created a solar-powered flight record of 81 hours at a sailing altitude of 1,000 meters. Russia's Sova, with a wingspan of 9.5 meters, has three fuselages and three controllers to achieve active wing deformation control to reduce the risk of gusts and excessive wing bending during flying in bad weather.

The HALE solar-powered UAV must face the problems of the strong breeze in the speed of 54~80 km/hr (height between 7~14 km) when the UAV crosses the streaming layer, power management for long-term flight, and stability of flight control for high-altitude missions in long-term, low-temperature and low-pressure flight. This is beyond the function of general UAV Autopilot, and it must have an exclusive autonomous flight system, especially requires an exclusive autopilot module. Pixhawk autopilot system, which became popular after 2013 and complete by using a 32-bit single chip of ST Company. However, the computing power and the calculation speed of the guidance and control loops of these chips have their limits, and they are only usable designs. If we want to increase the completion of the integration for the aviation system and the calculation speed of the guidance and control loops, and take into account the future expansion, those traditional autopilots are quite limited and impossible, not to mention the introduction of more advanced flight control theory, multi-aircraft formation flight for national defense, image processing or intelligent calculation.

At present, large-area environmental monitoring is still dominated by satellites, but the cost of satellite design, production and launch deployment is relatively expensive. Satellites can only take pictures of Taiwan for a few minutes every day. Long-stay UAVs with solar power and battery energy storage carry mission payloads at flight altitudes (3-22 km), similar to geostationary satellites that cruise over the mission area for days to months.

According to what is known, if the function of the autopilot is to be increased, the current known method is to use a multi-board system to divide the work with the autopilot. The most important technology core of UAV is autopilot, which integrates aviation sensing and flight recording system, power management system, flight servo control system and communication and navigation system. The autopilot can only perform flight control and navigation calculations after receiving the aviation data, and then further achieve the goal of autonomous flight, receive ground control signals and downlink the flight status to the ground station through wireless communication, and the owner of the unmanned aircraft is the operator of the ground station. Furthermore, the existing conventional technology only has a single control chip and a set of aviation sensing modules. When one of the important sensing modules such as GPS, AHRS, and pitot tube fails, the aircraft will not be able to fly, thus causing unsafety and inconvenience when the UAV is in the air for a long time.

It is known from the above mentions, the functional construction of the above-mentioned conventional technology in the autopilot system and the flight sensing system is indeed not perfect, so there is a need for further improvement. In view of this, how to develop a dual-autopilot technology with control rights transfer and backup aviation sensors has become a technical issue that industry, academics and professionals in the related technical field are eager to challenge and solve.

SUMMARY OF THE INVENTION

The main purpose of the present invention is to provide an autopilot system with switchable dual autopilot modules and backup aviation sensors. It is mainly built by hardware and software with primary and secondary autopilot modules, and dual aviation sensing modules to allow the general automatic flight to be controlled by the primary autopilot system, and when the primary autopilot module is disabled, the secondary automatic flight system takes over the work of autopilot control. The technical means to achieve the main purpose of the present invention include UAV, primary autopilot module, secondary autopilot module, switching module and multiple aviation sensing modules. The primary autopilot module and secondary autopilot module are correspondingly equipped with a first aviation sensing module and a second aviation sensing module. The primary autopilot module produces response signal according to the request signal produced by the secondary autopilot module. When the first response signal is no longer produced by the primary autopilot module for a preset time, the switching module switches controls of the flight control module from the primary autopilot module to the secondary autopilot module, and the secondary autopilot module uses the aviation data of the second aviation sensing module to provide flight control signals to the flight control module.

DETAILED DESCRIPTION OF THE PREFERRED EMBODIMENT

Figure 1:
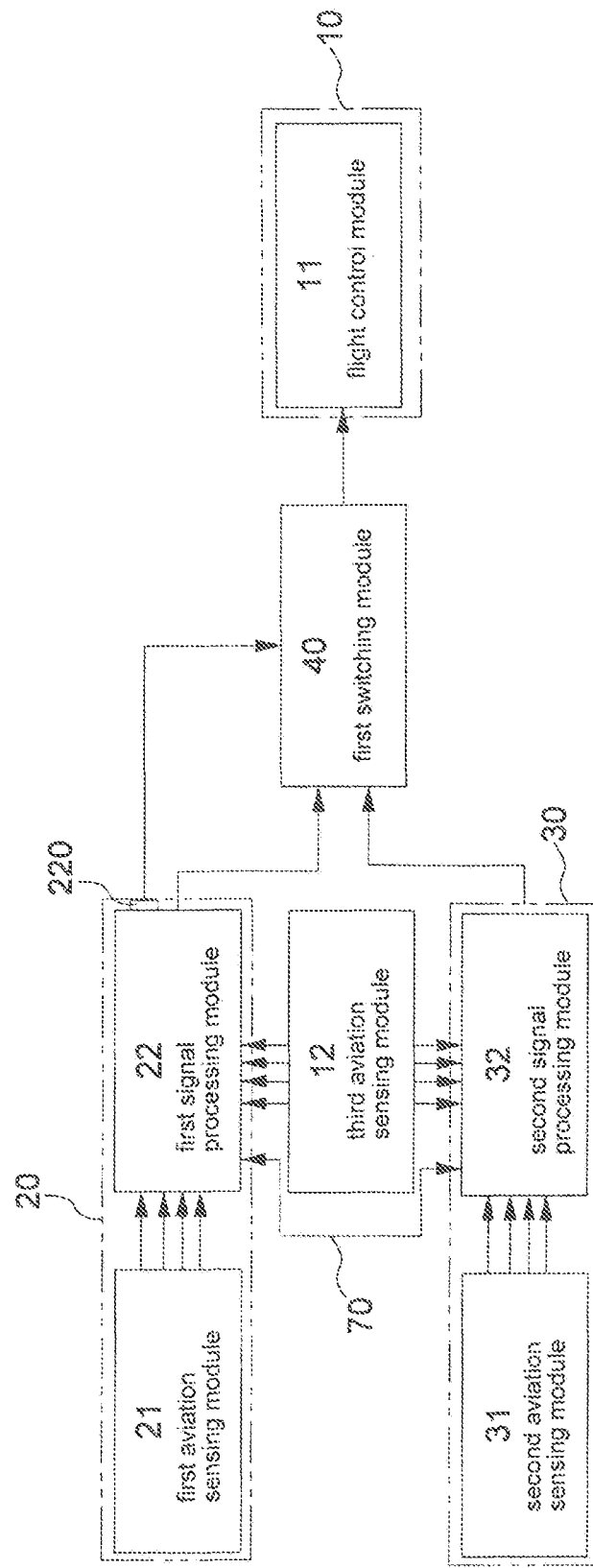
FIG. 1 is a functional block schematic diagram of one embodiment of the present invention.

Referring to FIG. 1, one specific embodiment of the present invention, the invented system comprises a high-altitude long endurance (HALE) solar-powered UAV 10, a primary autopilot module 20, a secondary autopilot module 30 and a first switching module 40. A flight control module 11 is set on the solar-powered UAV 10 and configured to control the flight of the solar-powered UAV 10. The primary autopilot module 20 is set on the solar-powered UAV 10 and configured to control the flight control module 11 to control the flight of the solar-powered UAV 10. The primary autopilot module 20 includes a response signal producing module 220 which is configured to be triggered by the request signals from the secondary autopilot module 30 for producing first response signals correspondingly. The secondary autopilot module 30 is installed on the solar-powered UAV 10. The first switching module 40 is configured to be triggered by the first response signals to select the primary autopilot module 20 to take over the control of the flight control module 11 to control the flight of the solar-powered UAV 10. When the first response signal no longer produced by the response signal producing module 220 of the primary autopilot module 20 or loses or abnormal, the first switching module 40 switches and selects the secondary autopilot module 30 to take over the control of the flight control module 11 to control the flight of the solar-powered UAV 10.

Referring to FIG. 1, the primary autopilot module 20 includes a first aviation sensing module 21 configured for generating a plurality of first aviation sensing signals and a first signal processing module 22 configured for interpreting and processing the plurality of first aviation sensing signals into a plurality of first aviation data. The secondary autopilot module 30 includes a second aviation sensing module 31 which is configured for generating a plurality of second aviation sensing signals and a second signal processing module 32 configured for interpreting and processing the plurality of second aviation sensing signals into a plurality of second flight state information.

Figure 2:
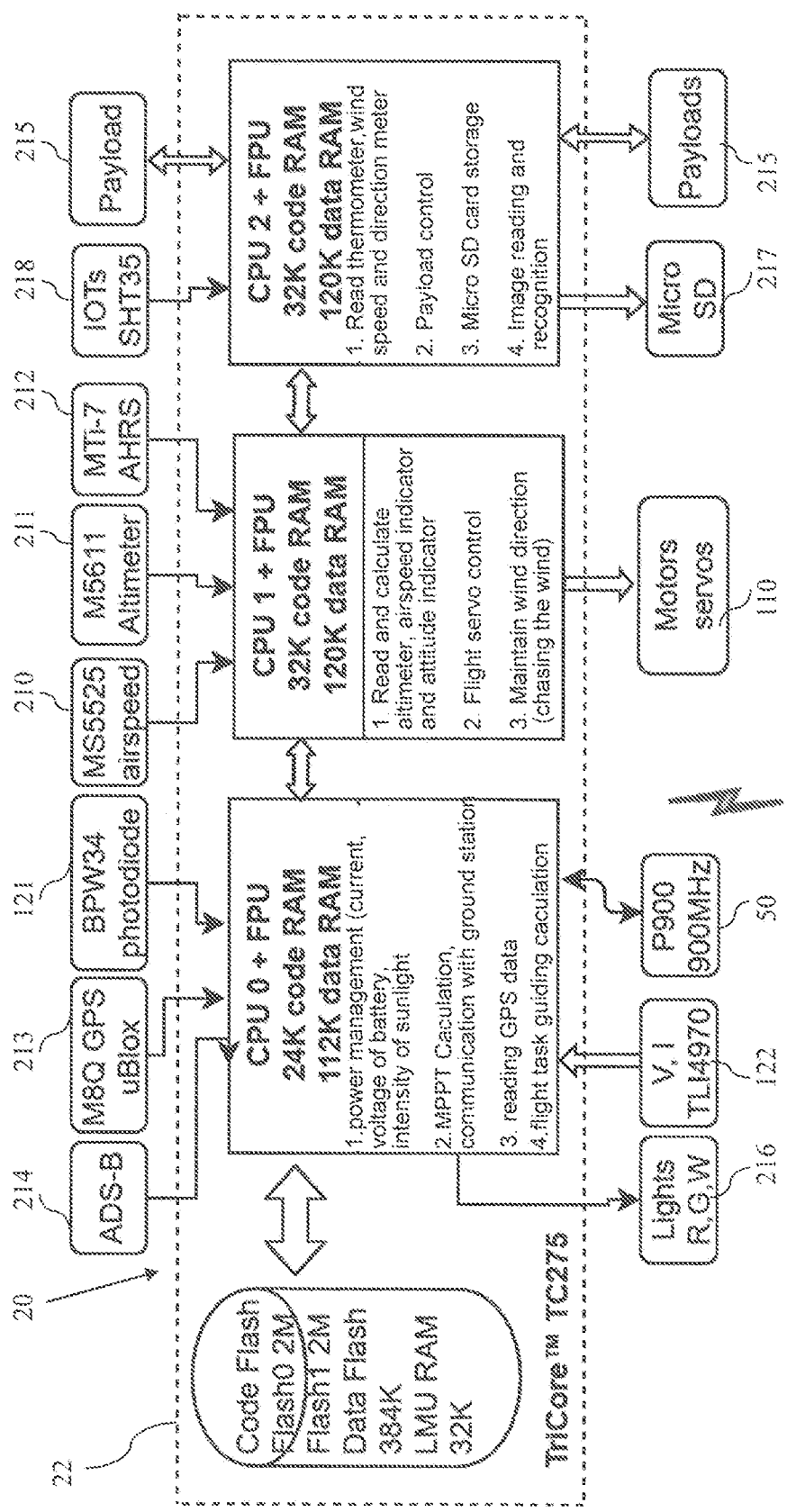
FIG. 2 is a schematic diagram of the core processing and aviation sensing implementation of the primary autopilot module according to the present invention.
Figure 3:
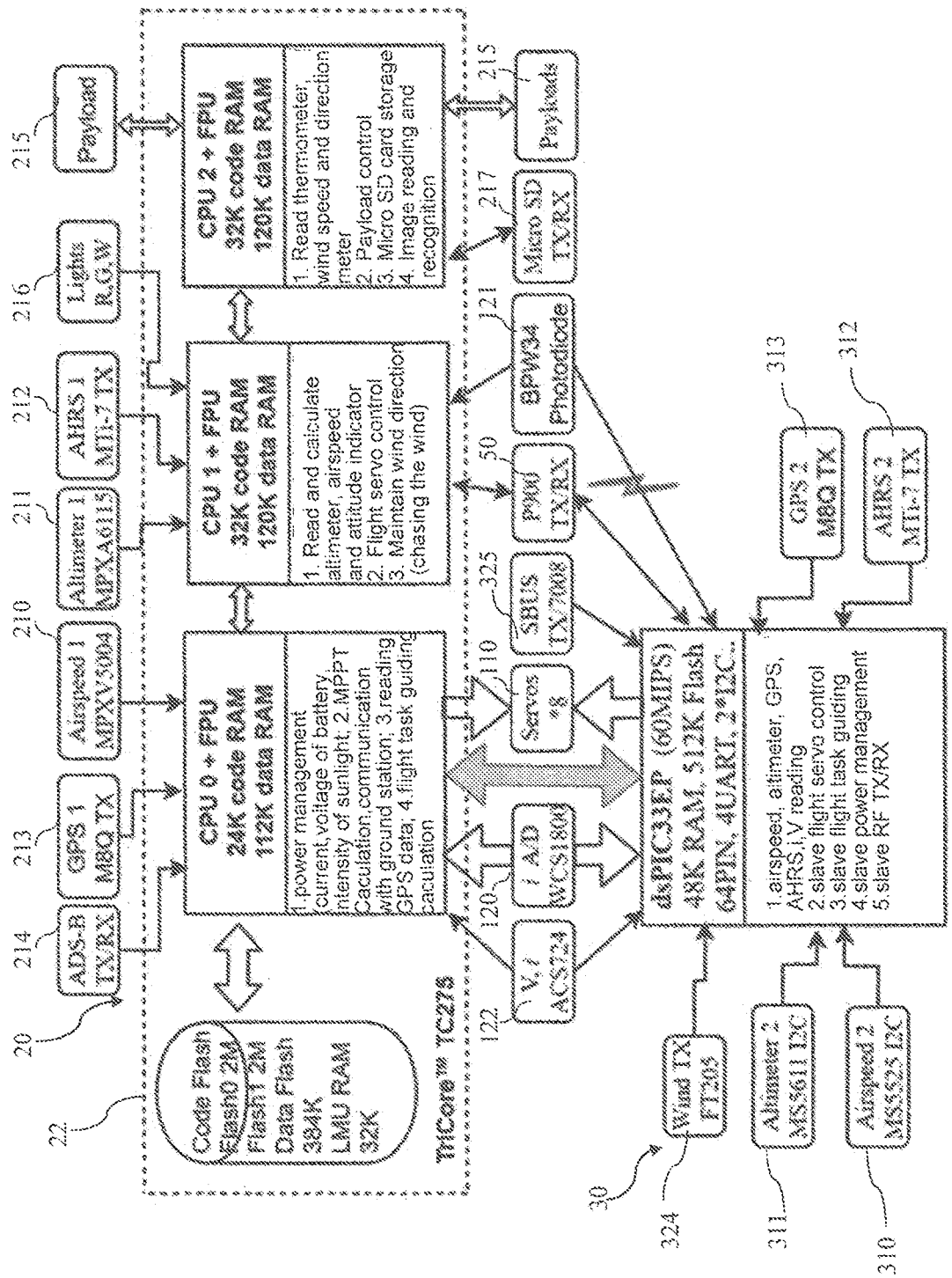
FIG. 3 is a schematic diagram of the core processing and aviation sensing implementation of the primary and secondary autopilot according to the present invention.

Referring to FIGS. 2 and 3, the first aviation sensing module 21 and the second aviation sensing module 31 respectively include an airspeed gauge 210,310 for obtaining airspeed data, a barometric altimeter 211,311 for obtaining barometric altitude data, a triaxial attitude instrument 212,312 for obtaining triaxial attitude data and a GPS 213,313 for generating positioning signals.

Referring to FIGS. 2 and 3, the system of the present invention further includes a third aviation sensing module 12 shared by and electrically connected to the first signal processing module 22 of the primary autopilot module 20 and the second signal processing module 32 of the secondary autopilot module 30. The third aviation sensing module 12 includes a current consumption meter 122 for obtaining data of current consumption of the solar-powered UAV 10, a solar intensity meter 121 for sensing sunlight intensity, and a voltage-ampere meter 120 for sensing the power consumption of a solar power generation system and the flight control module 11 of the solar-powered UAV 10. The data of current consumption of the UAV is transmitted to the first and second signal processing modules 22, 32 through an UART interface and AD conversion.

Figure 5:
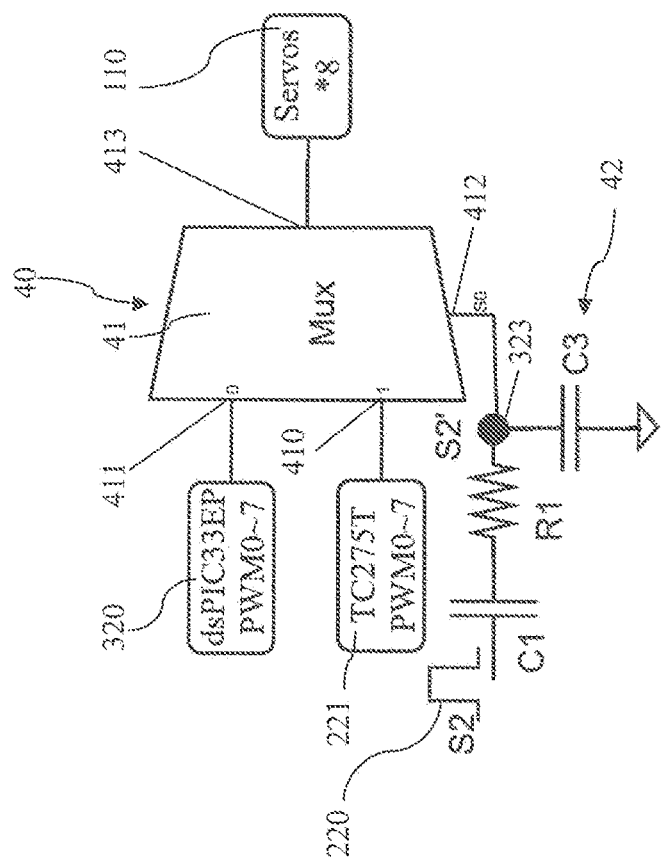
FIG. 5 is a schematic diagram of implementation framework of the switching control of the switching module according to the present invention.
Figure 5:
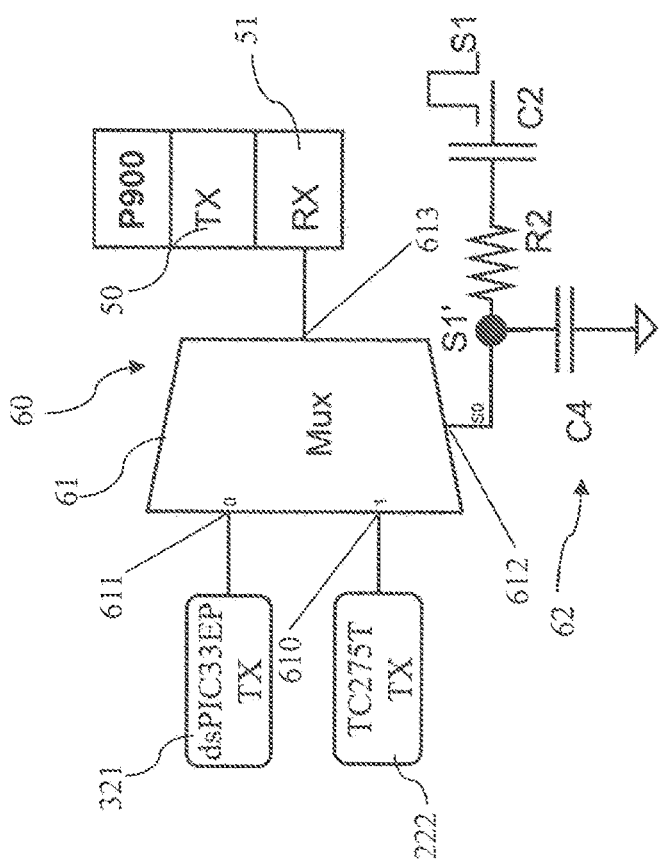

Referring to FIGS. 1 and 5, in one embodiment of the present invention, the first switching module 40 includes a first data multiplexer 41 (Mux) and a first signal interactive circuit 42. The first data multiplexer 41 includes a first and a second input parts 410, 411, a first switching part 412 and an output part 413. The first input part 410 of the first data multiplexer 41 is electrically connected to the first signal output part 221 (TX) of the first signal processing module 22 for outputting first control signals to the flight control module 11. The second input part 411 of the first data multiplexer 41 is electrically connected to the second signal output part 320 (TX) of the second signal processing module 32 for outputting second control signals to the flight control module 11. The first switching part 412 of the first data multiplexer 41 is electrically connected to an output end of the first signal interactive circuit 42. An input end of the first switching part 412 of the first data multiplexer 41 is electrically connected to first switching selection pins S2 of the first signal processing module 22 for interacting by the first request signal and actuating the response signal producing module 220 to produce the first response signal and input into the first signal interactive circuit. The first output part 413 of the first data multiplexer 41 is electrically connected to the plurality of PWM servo channels 110 of the flight control module 11. When the first switching selection pin S2 continuously generates the first response signal (in squire wave), the first response signal is continuously input to the switching part of the first data multiplexer 41 through the first signal interactive circuit 42 so that the first data multiplexer 41 actuates the first signal output part 221 (TX) electrically conducting with the plurality of PWM servo channels 110, so that the first control signals of the first signal processing module 22 are continuously transmitted to the plurality of PWM servo channels 110 for the flight control module 11, and so that the primary autopilot module 20 continuously takes over the flight of the UAV 10. When the first switching selection pin S2 cannot generate the first response signal because of failure of the first signal processing module 22, the first switching part does not receive the first response signal for a preset time, the first data multiplexer 41 actuates the second signal output part 320 (TX) electrically conducting with the plurality of PWM servo channels 110, so that the second control signals of the second signal processing module 32 is transmitted to the plurality of PWM servo channels 110 for the flight control module 11, and so that the secondary autopilot module takes over the flight of the UAV 10.

Specifically, as shown in FIG. 5, the first signal interactive circuit 42 includes a first capacitor C1, a first resistor R1 and a third capacitor C3. One end of the first capacitor C1 is used as the input end of the first signal interactive circuit 42 and is electrically connected to the first switching selection pin S2 of the first signal processing module 22, the other end of the first capacitor C1 is electrically connected to one end of the first resistor R1, the other end of the first resistor R1 is electrically connected to one end of the third capacitor C3, and a contact point between the first resistor R1 and the third capacitor C3 is used as the output end of the first signal interactive circuit 42 and electrically connected to the first switch part 412 of the first data multiplexer 41 and the second switching selection pins S2' of the second signal processing module 32 correspondingly; the other end of the third capacitor C3 is grounded.

Figure 4:
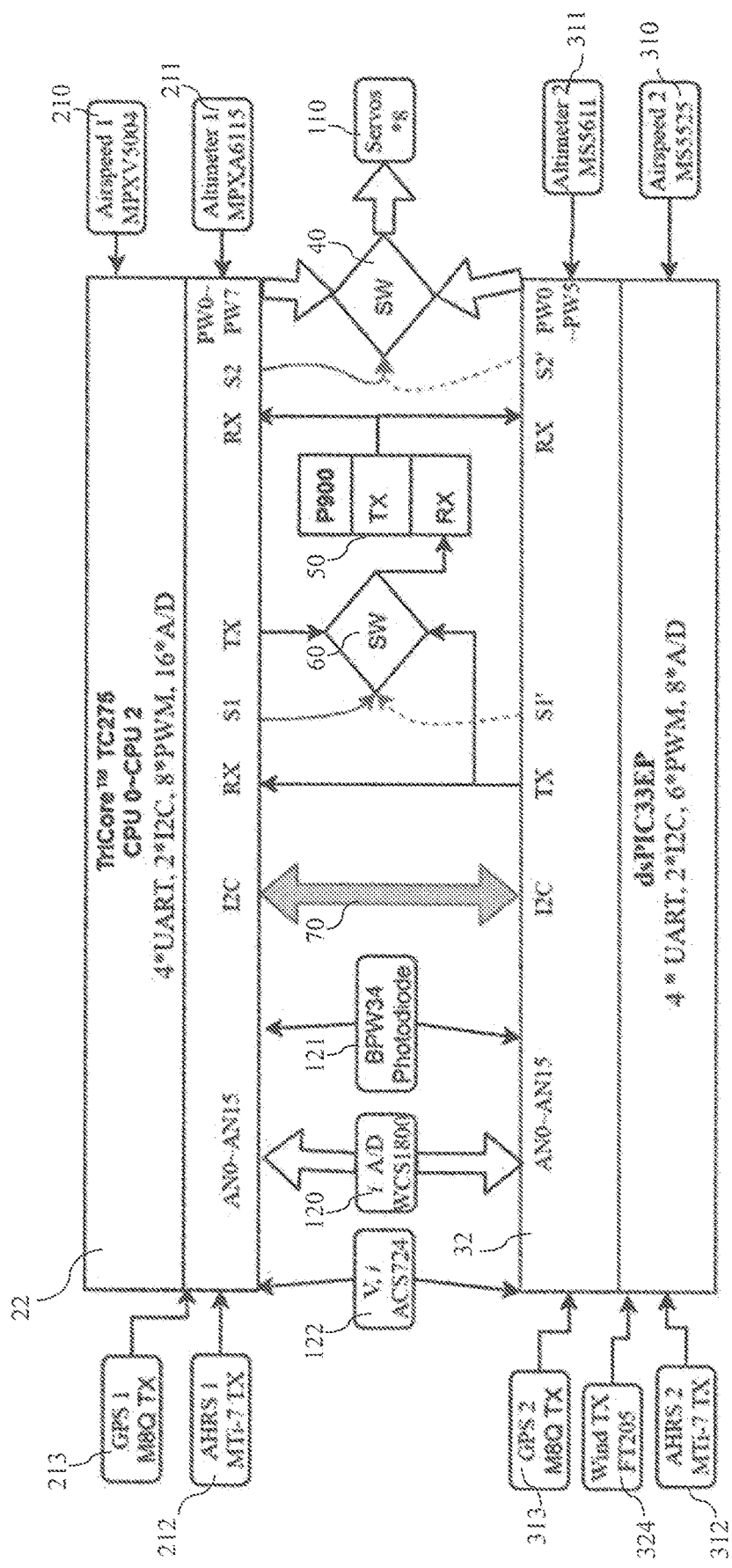
FIG. 4 is a schematic diagram of the implementation framework of the switching control of the primary and secondary autopilot modules according to the present invention.

Referring to FIGS. 2 to 4, the system of the present invention further includes a long-distance wireless communication module 50 and a second switching module 60 for carrying out long-distance wireless communication with a ground station. The second switching module 60 includes a second data multiplexer 61 and a second signal interactive circuit 62. The second data multiplexer 61 includes a third and fourth input parts 610, 611, a second switching part 612 and a second output part 613. The third input part 610 of the second data multiplexer 61 electrically connected to the first wireless signal output pin 222 (TC275T TX) of the first signal processing module 22 for transmitting first wireless signals output from the first signal processing module 22, and the fourth input part 611 of the second data multiplexer 61 is electrically connected to the second wireless signal output pin 321 (dsPIC33EP TX) of the second signal processing module 32 for transmitting second wireless signals output from the second signal processing module 32. The second switching part 612 of the second data multiplexer 61 is electrically connected with an output end of the second signal interactive circuit 62, the output end of the second signal interactive circuit 62 is electrically connected to fourth switch selection pins S1' of the second signal processing module 32 for receiving a second request signal produced by the request signal producing module 323. An input end of the second signal interactive circuit 62 is electrically connected to third switching selection pins S1 of the first signal processing module 22 for interacting by the second request signal and actuating the response signal producing module to produce a second response signal and input into the second signal interactive circuit 62. The second output part 613 of the second data multiplexer 61 is electrically connected to the long-distance wireless communication module 50 so that the first and second wireless signals can be transmitted to the ground station through the long-distance wireless communication module 50. When the second switching part does not receive the second response signal for a preset time, the second data multiplexer 61 actuates the fourth input part 611 to electrically conduct with the long-distance wireless communication module 50, so that the second wireless signals can be transmitted to the ground station through the long-distance wireless communication module 50.

Specifically referring to FIG. 5, the second signal interactive circuit 62 includes a second capacitor C2, a second resistor R2 and a fourth capacitor C4. One end of the second capacitor C2 is used as the input end of the second signal interactive circuit 62 and is electrically connected to the third switch selection pin S1 of the first signal processing module 22. The other end of the second capacitor C2 is electrically connected to one end of the second resistor R2. The other end of the second resistor R2 is electrically connected to one end of the fourth capacitor C4. The other end of the fourth capacitor C4 is grounded. A contact point between the second resistor R2 and the fourth capacitor C4 is used as the output end of the second signal interactive circuit 62 and is electrically connected to the second switching part 612 of the second data multiplexer 61 and the fourth switching selection pins S1' correspondingly. The other end of fourth capacitor C4 is grounded.

Referring to FIGS. 1, 3 and 4, the primary autopilot module 20 is connected with the secondary autopilot module 30 through a signal transmission interface 70 (such as a I2C communication interface). When the solar-powered UAV 10 flies, the secondary autopilot module 30 periodically sends a normal request signal to the primary autopilot module 20 through the signal transmission interface 70. When the primary autopilot module 20 receives the normal request signal, the primary autopilot module 20 through the signal transmission interface 70 sends a normal response signal to the secondary autopilot module 30. When the secondary autopilot module 30 does not receive the normal response signal, the secondary autopilot module 30 continues to repeatedly send out the normal request signal for a preset time. When the normal request signal continues to be issued and the secondary autopilot module 30 does not receive first response signal for a preset time, the secondary autopilot module 30 judges that the primary autopilot module 20 is in faulty, and then the secondary autopilot module 30 takes over the control of the flight control module 11.

The autopilot hardware system and a plurality of aviation sensing modules of the present invention can indeed accomplish the autopilot hardware architecture with dual chip and dual redundant aviation sensing modules. Among the invented system, the dual-chip system adopts the master and slave division of labor. Usually, autopilot is handled by the first signal processing module 22 of the primary autopilot module 20. The first signal processing module 22 is built in a 32-bit tri-core chip as the master with strong computing power. The second signal processing module 32 is built in a 16-bit single-core chip as the slave configured to monitor the health status of the master chip and enhance the I2C communication interface sensor with better interface capabilities of read, and to share the second aviation sensing module and wind direction and speed data with the master chip. If the second signal processing module 32 of the secondary autopilot module 30 find and confirm that the master chip is disabled, it will take over most of the work of the autopilot, end the mission of flight, and return and land the UAV for inspection. The health status of the second signal processing module 32 is maintained by its own watchdog, and the master and slave chips use the I2C communication interface for their communication.

Preferably, the first signal processing module 22 of the present invention adopts the first generation of AURIX™ TC275T three-core chip as the master chip, which has 1440DMIPS@200 MHz for integrating the processing of aviation sensors such as airspeed gauge, barometric altimeter, triaxial attitude and GPS and Micro SD flight record card, and further integrating the processing of solar intensity meter, temperature and humidity meter, voltmeter and ammeter required by the solar-powered UAV 10, and then for outputting relevant control signals through 8 PWM servo channels 110 to control the motor and the wing surface server, and carrying out the wireless transmission of uplink and downlink data through the long-distance wireless communication module 50 (P900).

Preferably, the second signal processing module 32 of the present invention adopts disPIC33 single-core chip as slave chip which is a cheaper 16-bit microchip. The first signal processing module 22 is built with the driver of the reading interface of the aviation sensing module and sensor's data fusion program, to integratively process airspeed gauge 210, 310, barometric altimeter 211, 311, triaxial attitude indicator 212, 312, GPSs 213, 313 and Micro SD flight record card 217, and further process solar intensity meter 121 (BPW34), temperature and humidity meter 218 (SHT35), voltage and current meter 120 (WCS1800) required by the solar-powered UAV 10. However, because the driver around the TC275T three-core chip is not easy to modify, there is no problem in the use of the UART interface and AD conversion, but the use of the I2C communication interface and direct memory access (DMA) is limited by the sample code and cannot be modified to the functions required by the present invention. There are many sensors with I2C as the interface, so the present invention uses the chip series of dsPIC33EP as the slave chip which is more convenient to modify the I2C and DMA programs to cooperate with the master chip (TC275T three-core chip), and has the redundant signal processing function of autopilot. The dsPIC33EP chip uses I2C2 to collect and process sensor's signals and data, and then transmits those signals and data to TC275T chip through another I2C1 or UART interface. In the present invention, the more important GPSs 213, 313, triaxial attitude gauges 212, 312 (AHRS), barometric altimeters 211, 311 and airspeed gauges 210, 310 are respectively processed by TC275T chip and dsPIC33EP chip, so that the first and second aviation sensing modules 21, 311 are in a redundant arrangement and mutually shared by the primary autopilot module 20 and the secondary autopilot module 30.

As shown in FIGS. 2 to 5, the first signal processing module 22 is electrically connected to a broadcast automatic monitoring module 214 (ADS-B), payload sensing module 215, aircraft display light 216 (Lights R.G.W) and flight record card 217 (Micro SD). The second signal processing module 32 is electrically connected to an ultrasonic wind speed sensor 324 (Wind TX FT205) and a SBUS receiver 325 (TX/7008). Among the system, ADS-B is an aircraft surveillance technology. The UAV 10 determines its position through the satellite navigation system and broadcasts its position periodically so that it can be tracked. Wind TX FT205 is a new generation of lightweight supersonic wind speed sensor. The SBUS receiver 325 is the receiver of the manual remote controller in a visual range. Except for the load of the basic system that maintains the normal operation, the rest of the load is called the payload. The payload is usually expressed by weight. On an aircraft including civil aircraft, military aircraft and unmanned aircraft, the payload refers as the load that can be consumed, transported or used to achieve certain special missions, such as cameras or base stations.

As shown in FIG. 3, the peripherals including current consumption meter 122 (ACS724) for the autopilot, voltage and current meter 120 (WCS1800) for measuring the power consumption of solar power generation system and flight control module 11, and solar power meter 121 (BPW34) for measuring sunlight intensity, all are with voltage outputs directly connected to the A/D conversion inputs of the master chip and the slave chip, so as to be shared and processed by the master chip and the slave chip without switching circuits. The TX pin of the long-distance wireless communication module 50 (P900) can also be directly connected to the RX pins of the Universal Asynchronous Receiver Interface (UART) of the master chip and the slave chip. As for the receiving end 51 (RX) of the long-distance wireless communication module 50, it is for wireless transmission to the ground station, so a switching function setting for wireless signal transmission channels is required for switching the wireless signal transmission from the master chip or from the slave chip through the first switching selection pin S1 and the third switching selection pin S1'. Also, a switching function setting for 8 PWM servo channels 110 for control signal transmission is required for switching the master chip and the slave chip to perform the flight control and navigation through the first switching selection pin S2 and the second switching selection pin S2'. As shown in FIG. 5, the main program of the present invention designed for the master chip will generate first and second response signals (square wave signals) to the first switching selection pin S2 and the third switching selection pin S1. The first switching selection pin S2 passes the second response signal through the second capacitor C2 and the second resistor R2 to the second switching selection pin S2', or the third switching selection pin S1 passes the first response signal through the first capacitor C1 and the first resistor R1 to the fourth switching selection pin S1'. When the fourth and second switching selection pins S1', S2' are at high potentials respectively, i.e. the switching selection lines of the first and second signal interactive circuits 42, 62 are at high potentials respectively, the selection of server is controlled by the master chip TC275T, i.e. the flight of the UAV 10 and the wireless signal transmission to the ground station are controlled by the master chip TC275T. When the master chip fails, the first and second response signals no longer be generated, the switching selection lines of the first and second signal interactive circuits 42, 62 automatically become low potentials respectively, i.e. the fourth and second switching selection pins S1', S2' are at low potentials respectively, and the selection of server is controlled by the slave chip dsPIC33EP, i.e. the flight of the UAV 10 and the wireless signal transmission to the ground station are controlled by the slave chip dsPIC33EP.

In the present invention, when the master chip fails, the slave chip takes over and controls the aircraft to fly back to the ground station and land (through remote control or automatic control). When the slave chip takes over the control of the aircraft, it must have the capabilities of the most basic aviation data and servo control. Therefore, the basic sensors such as GPS2, AHRS2, airspeed gauge and barometric altimeter are directly and electrically connected to the slave chip, the sensing signals of those basic sensors do not need to be provided by the master chip. The main program of the master chip of the present invention is designed to generate first and second response signals in square waves which are passed through the first and second signal interactive circuits 42, 62, so that the switching selection lines of the first and second signal interactive circuits 42, 62 are at high potentials respectively, and so that the selection of server is controlled by the master chip. When the master chip is disabled, the first and second response signals will no longer be generated, so that the switching selection lines of the first and second signal interactive circuits 42, 62 are at low potentials respectively, and so that the selection server is controlled by the slave chip. The slave chip can know the failure of the master chip through the following three steps: (1) continuously read when the signals of S1' or S2' is 0; (2) the slave chip repeatedly sends health requests through the communication between the master and slave chips; if the master chip does not reply within a predict period of time, it means that the master chip is disabled; and (3) if the slave chip receives the health content of the master chip, and the health content is an abnormal health status.

Figure 6:
FIG. 6 is a schematic diagram of the communication format for the primary autopilot module sending reading signals to the secondary autopilot module according to the present invention.
Figure 7:
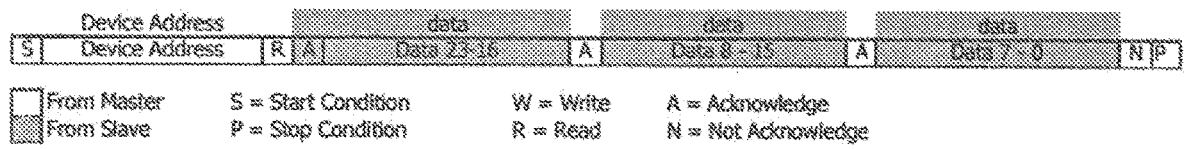
FIG. 7 is a schematic diagram of the communication format for the secondary autopilot module sending request signals to the primary autopilot module according to the present invention.
Figure 9:
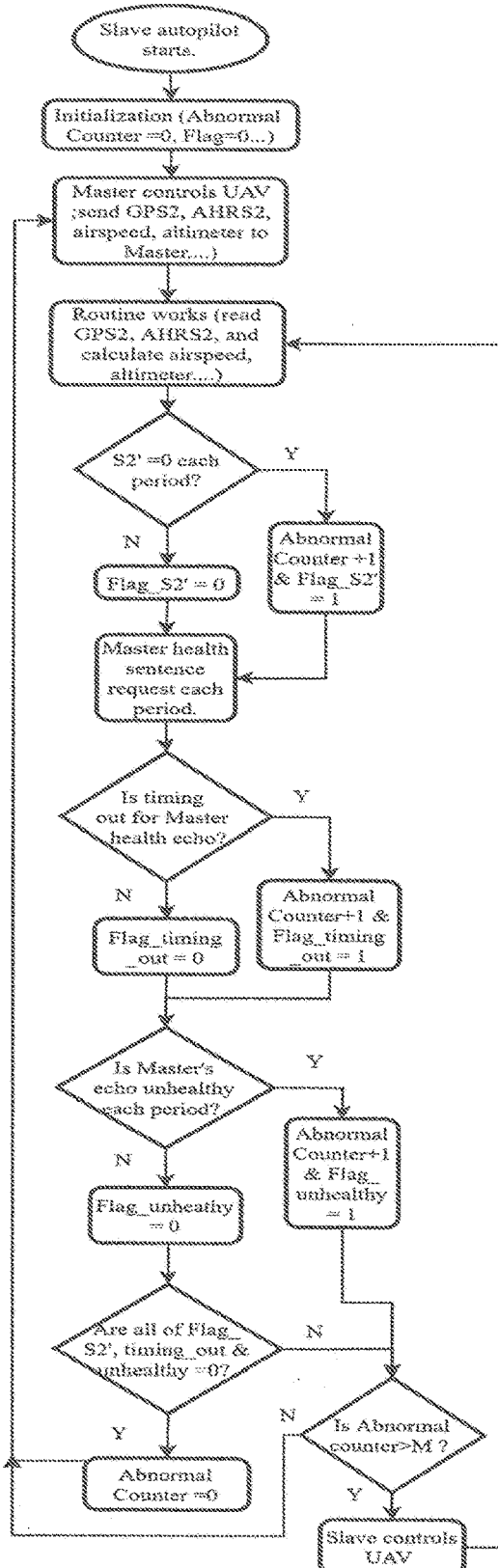
FIG. 9 is a schematic diagram of the implementation of the control flow of the secondary autopilot module according to the present invention.

The program flow chart of the slave chip shown in FIG. 9 is used to realize the sensing status and its procession for the master chip being disabled. When the slave chip senses the failure of the master chip, the user can try to reset the master chip firstly, takes over the control and navigation of the aircraft if the reset is unable, and then ends the flight task and flies the solar-powered UAV 10 back to the ground station for inspection. As for the health status of the slave chip, the maintenance of the health of the slave chip depends on its own watchdog. In addition, if the slave chip is to be forced to take over the control of the solar-powered UAV 10, it is possible to change the third and fourth switching selection pins S1' and S2' which are usually set as input pins to output part, and to force the PWM servo channels to be used by the slave chip (dsPIC33EP). Since the slave chip usually needs to process the collected aviation sensing signals, and periodically transmit the signals of the second sets of GPS2 and AHRS2 to the master chip to achieve the redundancy of those important aviation sensors, and the health status of the master chip also needs to be monitored by the slave chip through these PWM servo channels. In order to increase the number of usable UARTs, the present invention chooses I2C1 as the communication interface of the master and slave chips. Of course, CAN bus can also be selected, but in the embodiment of the present invention, in order to save cost and power consumption, we select dsPIC33EP chip without CAN bus. Currently, the I2C communication architecture is selected for the communication between the master chip and the slave chip, and the address is 33h. The I2C communication protocol is shown in FIGS. 6 and 7.

Figure 8:
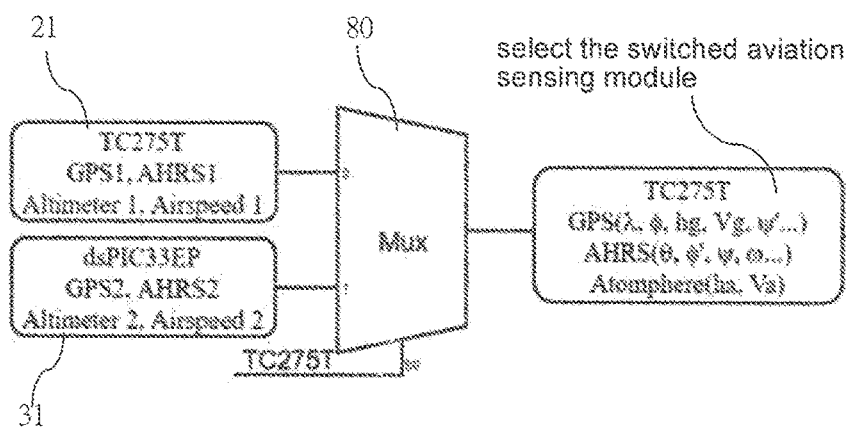
FIG. 8 is a schematic diagram of the switching control of the aviation sensing data according to the present invention.
Figure 10:
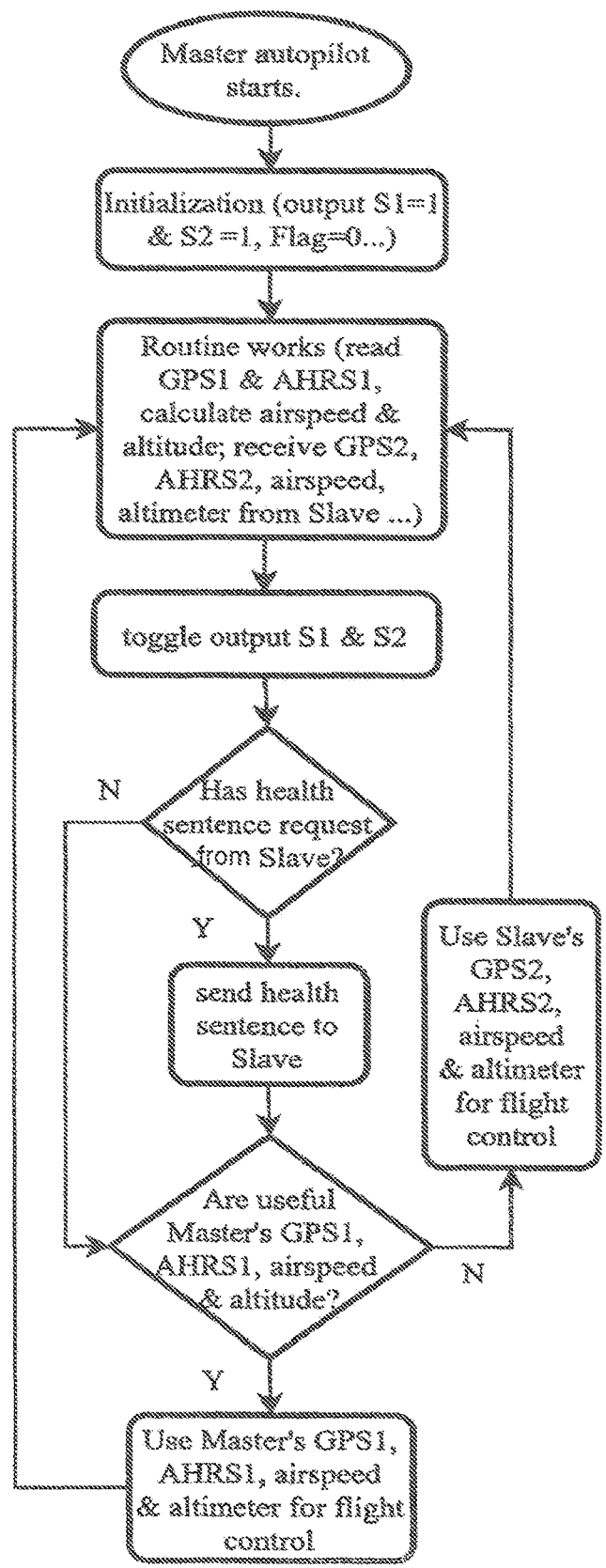
FIG. 10 is a schematic diagram of the control flow implementation of the primary autopilot module according to the present invention.

For fixed-wing aircraft, the basic aviation sensors that can maintain flight are important modules, including GPS, AHRS, airspeed gauge and barometric altimeter. As shown in FIGS. 3 and 8, in the embodiment of the present invention, the master and slave chips connect to the first and second aviation sensing modules 21, 31 correspondingly. Normally, the master chip performs the flight control and navigation tasks of the UAV 10. When one of above-mentioned important aviation sensing modules connected to the master chip is abnormal, the master chip will apply the aviation data of those relevant important aviation sensing modules transmitted from the slave chip to maintain the execution of the mission or complete the mission and return the UAV 10 for inspection and replacement. It is the design of the redundancy for those important modules in the present invention. From the communication protocol between the master and slave chips mentioned in the previous section, the slave chip transmits four sentences a, g, p, and t to the master chip at an update rate of 20 Hz through the I2C or UART. These four sentences include important information such as the signals and data of the GPS, AHRS, airspeed and barometric altitude to maintain the basic required flight aviation sensing signals and data. As shown in FIG. 8, the hardware of the third data multiplexer 80 or the software flow chart shown in FIG. 10, it can be seen the alternately switching the aviation sensing signals and data from the first aviation sensing module 21 and the second aviation sensing module 31. Furthermore, FIG. 9 is a schematic diagram of the implementation of the software control process of the secondary autopilot module of the present invention. FIG. 10 is a schematic diagram of the implementation of the software control process of the primary autopilot module of the present invention.

After the detailed description of the above-mentioned specific embodiments, the present invention can indeed be built with hardware and software for dual autopilot systems and multiple aviation sensing modules, so that the primary autopilot system is responsible for the normal autopilot control, and the secondary autopilot system is responsible for monitoring the health status of the primary autopilot system and reading the aviation sensors constructed by the I2C communication interface with better interface capabilities. When the primary autopilot system fails, the autopilot control is taken over by the secondary autopilot system.

While we have shown and described the embodiment in accordance with the present invention, it should be clear to those skilled in the art that further embodiments may be made without departing from the scope of the present invention.

What is claimed is:

1. An on-board redundant controller and standby aviation sensors in-flight reconfigurable autonomous flight system comprising:
   an UAV;
   a flight control module being installed on the UAV and configured to control the flight of the UAV;
   a primary autopilot module being built on the UAV and configured to control the flight control module to drive the flight of the UAV;
   a secondary autopilot module being built on the UAV and configured to control the flight control module to drive the flight of the UAV; and
   a first switching module configured to switch controls of the flight control module from the primary autopilot module to the secondary autopilot module;
   wherein, the primary autopilot module and the secondary autopilot module including a first aviation sensing module and a second aviation sensing module correspondingly configured to generate a plurality of first aviation sensing signals and second aviation sensing signals correspondingly; the primary autopilot module including a response signal producing module configured to produce a first response signal, and a first signal processing module configured to interpret and process the plurality of first aviation sensing signals into a plurality of first aviation data required for the controls of the flight control module; the secondary autopilot module including a request signal producing module configured to periodically produce a first request signal, and a second signal processing module configured to interpret and process the plurality of second aviation sensing signals into a plurality of second aviation data required for the controls of the flight control module; wherein, the response signal producing module producing the first response signal is triggered by the first request signal; wherein, when the first response signal is no longer produced by the response signal producing module for a preset time, the first switching module switches controls of the flight control module from the primary autopilot module to the secondary autopilot module.

2. The system as claimed in claim 1, wherein the first aviation sensing module and the second aviation sensing module respectively include an airspeed gauge for obtaining airspeed data, a barometric altimeter for obtaining barometric altitude data, a triaxial attitude instrument for obtaining triaxial attitude data, and a GPS for obtaining position, flight speed and flight direction data as the plurality of first and second aviation data correspondingly; the primary autopilot module and the secondary autopilot module share the airspeed data, the barometric altitude data, the triaxial attitude data, and the position, flight speed and flight direction data with each other; the first signal processing module and the second signal processing module respectively process the airspeed data, the barometric altitude data, the triaxial attitude data, and the position, flight speed and flight direction data; and the second signal processing module periodically transmits its processed airspeed data, barometric altitude data, triaxial attitude data, and position, flight speed and flight direction data to the first signal processing module.

3. The system as claimed in claim 2, wherein, the second signal processing module transmits its processed airspeed data, barometric altitude data, triaxial attitude data, and position, flight speed and flight direction data to the first signal processing module according to an update rate of 20 Hz through an I2C communication interface.

4. The system as claimed in claim 1, which further includes a third aviation sensing module shared and electrically connected by the primary autopilot module and the secondary autopilot module; the third aviation sensing module includes a current consumption meter for obtaining data of current consumption of the UAV, a solar intensity meter for obtaining data of intensity of sunlight, and a voltage-ampere meter for obtaining data of power consumptions of a solar power generation system and the flight control module of the UAV; the data of current consumption of the UAV is transmitted to the first and second signal processing modules through an UART interface and AD conversion.

5. The system as claimed in claim 1, wherein the first switching module includes a first data multiplexer and a first signal interactive circuit; the first data multiplexer includes a first and a second input parts, a first switching part and a first output part; the first input part is electrically connected to a first signal output part of the first signal processing module for outputting first control signals to the flight control module, the second input part is electrically connected to a second signal output part of the second signal processing module for outputting second control signals to the flight control module; the first switching part is electrically connected to an output end of the first signal interactive circuit, and the output end of the first signal interactive circuit is electrically connected to second switch selection pins of the second signal processing module for receiving the first request signal; an input end of the first signal interactive circuit is electrically connected to a first switch selection pin of the first signal processing module for interacting by the first request signal and actuating the response signal producing module to produce the first response signal and input into the first signal interactive circuit; the first output part is electrically connected to the plurality of PWM servo channels of the flight control module so that the first and second control signals can be transmitted to the flight control module through the plurality of PWM servo channels; wherein, when the first switching part does not receive the first response signal for a preset time, the first data multiplexer actuates the second input part to electrically conduct with the plurality of PWM servo channels, so that the second control signals of the second signal processing module are transmitted to the flight control module through the plurality of PWM servo channels.

6. The system as claimed in claim 5, wherein the first signal interactive circuit includes a first capacitor, a first resistor and a third capacitor, one end of the first capacitor is used as the input end of the first signal interactive circuit and is electrically connected to the first switch selection pins of the first signal processing module, the other end of the first capacitor is electrically connected to one end of the first resistor, the other end of the first resistor is electrically connected to one end of the third capacitor, and a contact point between the first resistor and the third capacitor is used as the output end of the first signal interactive circuit and electrically connected to the first switching part and the second switching selection pins of the second signal processing module correspondingly; the other end of the third capacitor is grounded.

7. The system as claimed in claim 1, which further includes a long-distance wireless communication module for long-distance wireless communication with a ground station and a second switching module; the second switching module includes a second data multiplexer and a second signal interactive circuit; the second data multiplexer includes a third and fourth input parts, a second switching part and a second output part; the third input part is electrically connected to first wireless signal output pins of the first signal processing module for transmitting first wireless signals from the first signal processing module; the fourth input part is electrically connected to second wireless signal output pins of the second signal processing module for transmitting second wireless signals from the second signal processing module; the second switching part is electrically connected to an output end of the second signal interactive circuit, the output end of the second signal interactive circuit is electrically connected to fourth switch selection pins of the second signal processing module for receiving a second request signal produced by the request signal producing module; an input end of the second signal interactive circuit is electrically connected to third switching selection pins of the first signal processing module for interacting by the second request signal and actuating the response signal producing module to produce a second response signal and input into the second signal interactive circuit; the second output part is electrically connected to the long-distance wireless communication module so that the first and second wireless signals can be transmitted to the ground station through the long-distance wireless communication module; wherein, when the second switching part does not receive the second response signal for a preset time, the second data multiplexer actuates the fourth input part to electrically conduct with the long-distance wireless communication module, so that the second wireless signals can be transmitted to the ground station through the long-distance wireless communication module.

8. The system as claimed in claim 7, wherein the second signal interactive circuit includes a second capacitor, a second resistor and a fourth capacitor; one end of the second capacitor is used as the input end of the second signal interactive circuit and is electrically connected to the third switching selection pins, the other end of the second capacitor is electrically connected to one end of the second resistor, the other end of the second resistor is electrically connected to one end of the fourth capacitor; a contact point between the second resister and the fourth capacitor is used as the output end of the second signal interactive circuit and electrically connected to the second switching part and the fourth switching selection pins correspondingly; the other end of the fourth capacitor is grounded.

9. The system as claimed in claim 1, wherein, the first signal processing module is built in a 32-bit tri-core chip, the second signal processing module is built in a 16-bit single-core chip; the second signal processing module periodically shares data of the second aviation sensing module with the first signal processing module; a health status of the second signal processing module is maintained by its own watchdog; and chips of the first signal processing module and the second signal processing module use an I2C communication interface for their communication.

10. The system as claimed in claim 9, wherein, the chip of the first signal processing module is TC275T of Infineon technologies AG, and the chip of the second signal processing module is dsPIC33EP of Microchip technology.

11. The system as claimed in claim 1, which further includes a third data multiplexer configured to alternately switching the aviation sensing signals and data from the first aviation sensing module and the second aviation sensing module.

12. The system as claimed in claim 1, wherein the first signal processing module is electrically connected to a broadcast automatic monitoring module (ADS-B), a payload sensing module, an aircraft display light (Lights R.G.W) and a flight record card (Micro SD); the second signal processing module is electrically connected to an ultrasonic wind speed sensor (Wind TX FT205) and a SBUS receiver (TX/7008); through the broadcast automatic monitoring module the first signal processing module broadcasts the position of the UAV periodically so that the UAV is trackable; the secondary autopilot module is controllable by a manual remote controller in a visual range through the SBUS receiver.

* * * * *